(12) United States Patent
Hormis et al.

(10) Patent No.: US 8,509,305 B2
(45) Date of Patent: *Aug. 13, 2013

(54) MOTION ESTIMATION FOR VIDEO PROCESSING USING 2-D (SPATIAL) CONVOLUTION

(75) Inventors: Raju Hormis, New York, NY (US); Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1055 days.

This patent is subject to a terminal disclaimer.

(21) Appl. No.: 12/508,498

(22) Filed: Jul. 23, 2009

(65) Prior Publication Data

US 2009/0285303 A1 Nov. 19, 2009

Related U.S. Application Data

(63) Continuation of application No. 10/957,373, filed on Sep. 30, 2004, now Pat. No. 7,606,309.

(51) Int. Cl.
*H04N 7/12* (2006.01)
*H04N 11/02* (2006.01)
*H04N 11/04* (2006.01)
*H04B 1/66* (2006.01)

(52) U.S. Cl.
USPC .................................................. 375/240.12

(58) Field of Classification Search
None
See application file for complete search history.

(56) References Cited

U.S. PATENT DOCUMENTS

| | | | |
|---|---|---|---|
| 4,633,426 A | 12/1986 | Venier | |
| 6,041,078 A * | 3/2000 | Rao | 375/240.16 |
| 6,141,372 A | 10/2000 | Chalmers | |
| 6,456,340 B1 * | 9/2002 | Margulis | 348/745 |
| 6,530,010 B1 * | 3/2003 | Hung et al. | 712/1 |
| 6,584,213 B2 | 6/2003 | Prakash et al. | |
| 6,611,560 B1 * | 8/2003 | Kresch et al. | 375/240.16 |
| 6,763,129 B1 | 7/2004 | Honda et al. | |
| 7,225,213 B2 | 5/2007 | Menkhoff | |
| 2004/0098548 A1 * | 5/2004 | Hansen et al. | 711/165 |
| 2005/0276515 A1 | 12/2005 | Shekter | |

OTHER PUBLICATIONS

"Motion Estimation"; Author Guidelines for 8; http://www.centar.net/word%20files/motion%20estimation/FSME.htm; 2 pages, accessed Jul. 15, 2004.

Toivonen, T., et al., "A New Algorithm for Fast Full Search Block Motion Estimation Based on Number Theoretic Transforms", Proceedings of the 9th International Workshop on Systems, Signals and Image Processing, (2002), 90-94.

* cited by examiner

*Primary Examiner* — Nhon Diep
(74) *Attorney, Agent, or Firm* — Blakely, Sokoloff, Taylor & Zafman LLP

(57) ABSTRACT

A device including a two-dimensional convolution unit to perform spatial image filtering. A reference frame mirroring unit is connected to the two-dimensional convolution unit. A mean square error (MSE) decision unit is connected to the two-dimensional convolution unit to perform motion estimation by selecting the displacement that minimizes MSE.

18 Claims, 3 Drawing Sheets

MOTION ESTIMATION FOR VIDEO PROCESSING USING 2-D (SPATIAL) CONVOLUTION

CROSS-REFERENCE TO RELATED APPLICATION

This application is a continuation of and claims priority from U.S. patent application Ser. No. 10/957,373 filed on Sep. 30, 2004.

BACKGROUND

1. Field

The embodiments relate to motion estimation, and more particularly to a two-dimensional convolution engine also used for motion estimation.

2. Description of the Related Art

Motion estimation (ME) is typically the most computationally demanding part of video compression. Video post-processing, such as motion-compensated filtering and deinterlacing, require reliable ME. One of the most widely used algorithms for ME is block matching, by which rectangular windows, for example N×N blocks, are matched against a reference frame (or field). The matching criterion is usually the sum of absolute errors for a particular displacement (m,n), defined as $$SAE(m, n) = \sum_{k1}^{N} \sum_{k2}^{N} t(k1, k2) - w(k1 - m, k2 - n), 0 \le (k1, k2) \le N$$

where t and w are the target and window (reference) frames respectively. Video encoders or processors typically have specialized accelerators that compute the SAE very quickly. If the search area is an $L_H \times L_V$ region, the engine finds the (m,n) displacement pair with minimum SAE within that region. Matching may also be performed with a mean-squared error criterion for the N×N block of pixels, defined as $$MSE(m, n) = 1/N^2 \sum_{k1}^{N} \sum_{k2}^{N} [t(k1, k2) - w(k1 - m, k2 - n)]^2,$$

$$0 \le (k1, k2) \le N$$

but this is more computationally complex due to the squaring operation.

Other stages of encoding or post-processing also require two-dimensional (2-D) convolution for spatial filtering for noise reduction, or for band-limiting prior to decimation. These filters also typically require dedicated hardware optimized for high-performance operation. The 2-D filter or convolver usually includes a bank of multipliers with filter coefficients and a memory buffer for data.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

The embodiments discussed herein generally relate to a method and apparatus to perform two-dimensional (2-D) convolution and motion estimation on using the same device. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
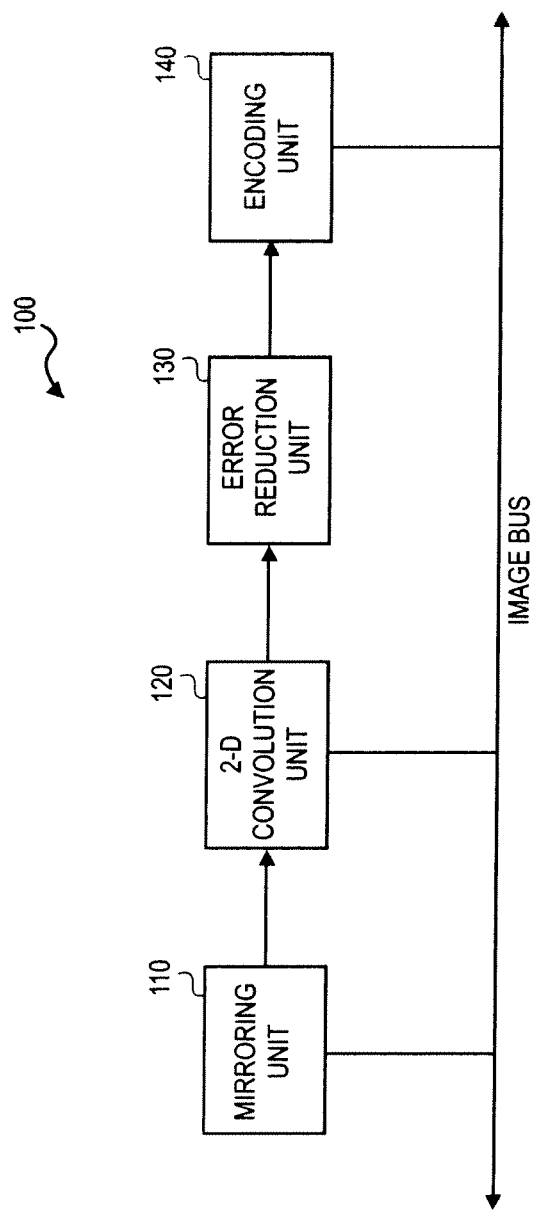
FIG. 1 illustrates an embodiment of a processing unit.

FIG. 1 illustrates an embodiment including a two-dimensional (2-D) convolution unit to perform spatial filtering and motion estimation. In device 100, reference frame mirroring unit 110 is coupled to 2-D convolution unit 120 (i.e., convolver or spatial-filter). Mean square error (MSE) decision unit (comparator) 130 is coupled to the 2-D convolution unit to perform motion estimation on device 100. In one embodiment device 100 also includes video encoding, compression or image enhancement unit 140, which is coupled to the output of the error (MSE) decision unit 130. The output of error (MSE) decision unit 130 is the estimated motion vector. Device 100 processes image pixels based on their associated intensity (i.e., brightness) or color component values, both can be considered as intensity. 2-D convolution unit 120 performs calculations on pixel set intensity values.

In 2-D convolution unit 110, the 2-D convolution of two sequences, for example target sequence t(m,n) and reference frame sequence w(m,n), is defined in one embodiment as:

$$y(m, n) = t(m, n) * * w(m, n) = \sum_{k1}^{N} \sum_{k2}^{N} t(k1, k2) - w(m - k1, n - k2)$$

In one embodiment the mean square error (MSE) definition used in block matching is:

$$MSE(m, n) = 1/N^2 \sum_{k1}^{N} \sum_{k2}^{N} [t(k1, k2) - w(k1 - m, k2 - n)]^2,$$

$$0 \le (k1, k2) \le N, 0 \le m < L_H, 0 \le n < L_V$$

$$= 1 / N^2 \left[ \sum_{k1}^{N} \sum_{k2}^{N} t(k1, k2)^2 + \right.$$

-continued $$\sum_{k1}^{N}\sum_{k2}^{N} w(k1-m, k2-n)^2 +$$

$$2\sum_{k1}^{N}\sum_{k2}^{N} t(k1, k2) - w(k1-m, k2-n)\Bigg]$$

Next in this embodiment a reasonable assumption is made that statistics of the image are locally stationary. Therefore, in this embodiment the first and second summation terms can be replaced with the following approximate constants:

$$MSE(m, n) = \sigma_t^2 + \sigma_w^2 + 2/N^2 \sum_{k1}^{N}\sum_{k2}^{N} t(k_1, k_2) - w(k_1-m, k_2-n)$$

$$= \sigma_t^2 + \sigma_t^N + 2/N^2 [t(m, n) * * w(-m, -n)],$$

by definition of 2-D convolution $$0 \le (k_1, k_2) \le N, 0 \le m < L_H, 0 \le n < L_v$$

In this embodiment the MSE is computed with a 2-D convolution performed by 2-D convolution unit 120 over a $L_H \times L_V$ area, as the reference frame pixel sets intensity values of w(m,n) are "mirrored" (i.e., inversed the sign) of indices or, alternatively, rearranging the addressing order to (-m,-n) by mirroring unit 110. Since the constant offset values (σ) are not changing the minimization decisions. In one embodiment the minimum MSE is selected for displacements m and n as follows:

$$\min\{MSE(m,n)\} \approx \min\{t(m,n)**w(-m,-n)\}, 0 \le m < L_H, 0 \le n \le L_V$$

In one embodiment, error (MSE) decision unit 130 determines the MSEs, compares the MSEs, and selects the set (m,n) that minimizes MSE(m,n) within the $L_H \times L_V$ search region. In one embodiment, to speed up computations, it is noted that for convolution, t(m,n)w(m,n)=w(m,n)t(m, n). Therefore, either the reference or target pixel data order can be mirrored. In this embodiment, mirroring the target t(m,n) data instead of the reference data is computationally less demanding since $L_H \times L_V$ is larger than N×N. Therefore, in this embodiment mirroring unit 110 mirrors (i.e., inverses) the target frame t(m,n) to t(-m,-n).

In one embodiment 2-D convolution unit 120 is coupled to a plurality of registers where filter coefficients are stored to increase performance during filtering operation. In one embodiment the mirrored target pixels t(-m, -n) are loaded into filter coefficient registers to maximize the performance for motion-estimation, where 2-D convolution and motion estimation are performed in the same device (i.e., device 100). In another embodiment mirroring is performed by permuting the access sequence to the values already stored in the registers.

In one embodiment after error (MSE) computation, decision unit 130 determines the (m,n) that minimizes the MSE, and the minimum error (MSE) decision unit 130 outputs motion vector. Therefore, in this embodiment by using 2-D convolution unit 120 to perform 2-D convolution with mirrored target data, device 100 can also be reused for motion estimation. In some embodiments, the resulting motion vectors from device 100 are used for video compression, using techniques such as moving picture experts group (MPEG) (see MPEG-1 standard (ISO/IEC 1172-2:1993, published 1993, ISO/IEC 1172-2:1993/Cor. 1:1996, published 1996, ISO/IEC 1172-2:1993/Cor. 2:1999, published 1999), the MPEG-2 standard (ISO/IEC 13818-2:2000, published 2000), the MPEG-4 standard (ISO/IEC 14496-2:2001), etc.) files, and H.264 (also known as MPEG-4 advanced video coding (AVC). In other embodiments, the motion vectors from 100 are used for video processing, such as motion-compensated deinterlacing, motion-compensated noise reduction, etc.

Figure 2:
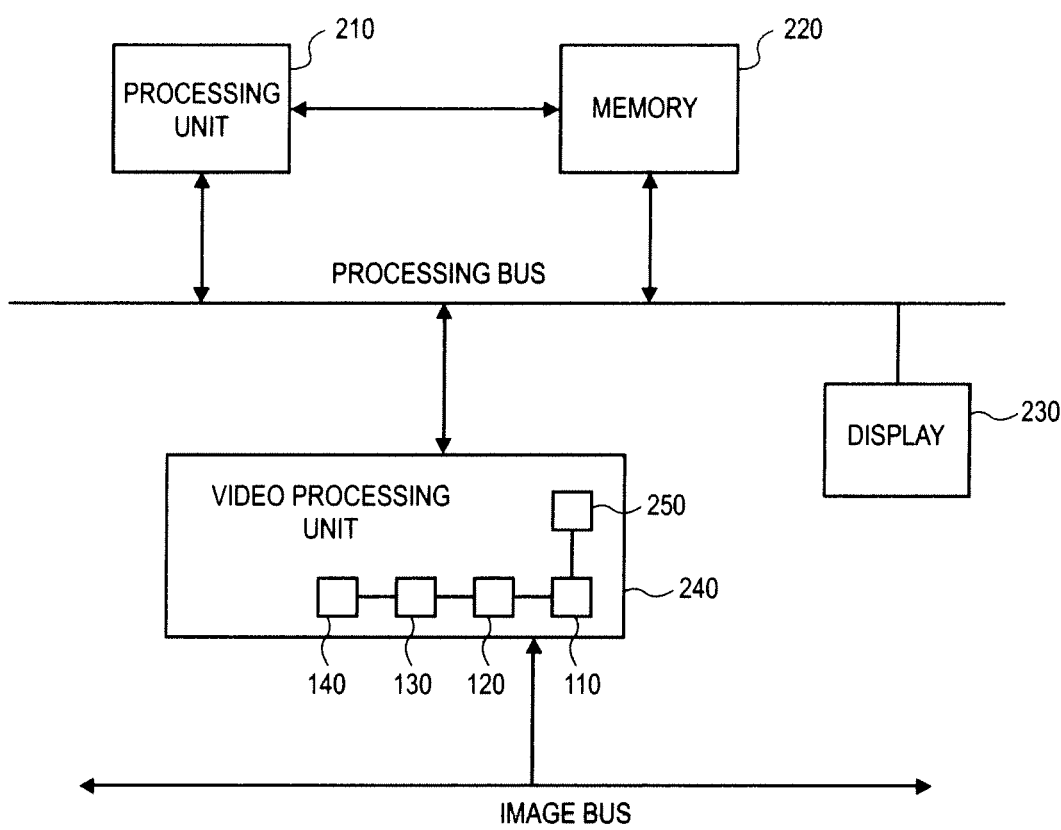
FIG. 2 illustrates a system of an embodiment.

FIG. 2 illustrates a system including a video processing unit to perform 2-D convolution and motion estimation. System 200 includes processing unit 210. Processing unit 210 includes devices such as a central processing unit (CPU), memory controller, cache memory units, etc. Memory unit 220 is coupled to processing unit 210. Memory 220 can be a non-volatile memory a hard disk drive (HDD), or a volatile memory such as random access memory (RAM).

Video processing unit 240 is coupled to a processing bus to communicate with processing unit 210 and to store/retrieve data/information from memory 220. Video processing unit 240 includes 2-D convolution unit 120 to perform 2-D convolution and to assist in motion estimating/computing by using a plurality of inverted target pixel sets as input. The inputted inverted target pixel sets are used as filter coefficients for the 2-D convolution. Video processing unit 240 further includes a reference frame mirroring unit 110 coupled to 2-D convolution unit 120. Minimum error (MSE) decision unit 130 is coupled to 2-D convolution unit 120.

Encoding, compression or image enhancement unit 140 (i.e., image post processing unit) is coupled to error (MSE) decision unit 130. As disclosed above, mirroring unit 110 inverses the sign of each of a plurality of target pixel sets. The inverted target pixel sets are used as input to video processing unit 240 through circuitry used to accept filter coefficients. Video processing unit 240 includes a plurality of registers 250 used to store data used by mirroring unit 110 and 2-D convolution unit 120.

In one embodiment system 200 includes display 230 and an image bus is connected to video processing unit 240. Display 230 can be any know type of display, such as a liquid crystal display (LCD), video monitor, flat screen display, television set, plasma screen display, etc. Alternatively, an image capture or recording device can be connected to video processing unit 240 in addition or instead of display 230.

Figure 3:
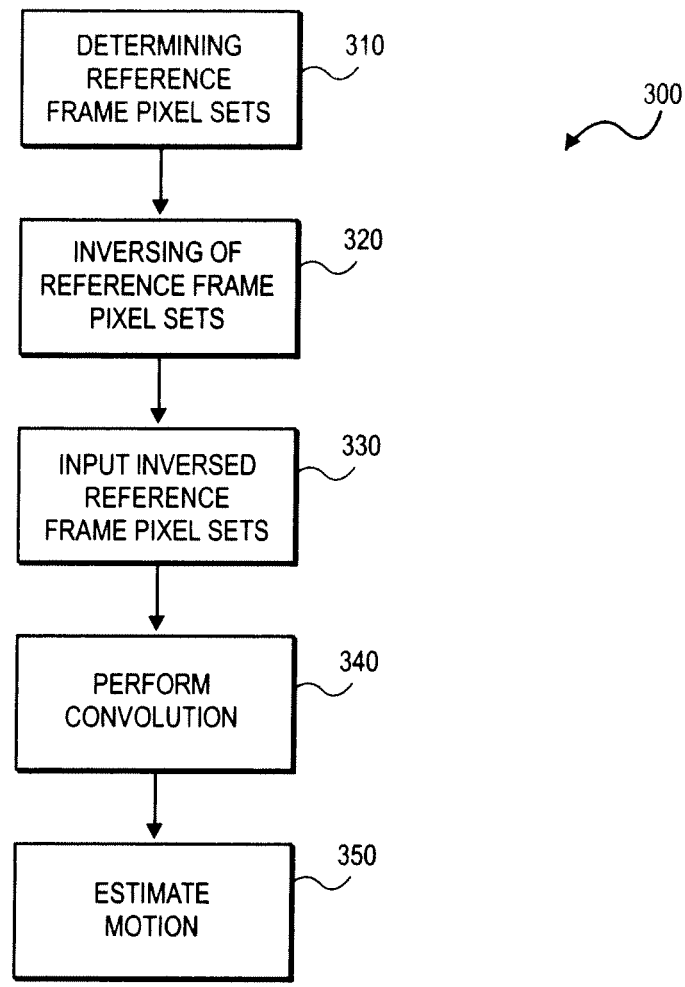
FIG. 3 illustrates a process of an embodiment in block form.

FIG. 3 illustrates a process in block format. Process 300 begins with block 310 where a plurality of reference frame pixel sets to be used in motion estimation are determined to be used as input data. In one embodiment a determination of target reference frame pixel sets to be used as input data is performed. In block 320 the address sign (i.e., + or −) of each of the plurality of target frame pixel sets is inverted. In block 330 the plurality of inverted target frame pixel sets are input to be used as a plurality of filter coefficients to a 2-D convolution unit (such as 2-D convolution unit 120).

Block 340 performs 2-D convolution as disclosed above with the plurality of filter coefficients. Block 350 performs motion estimation and outputs estimated motion vectors by determining a plurality of mean square errors and determining a plurality of pixel sets (m,n) that minimizes each of the plurality of mean square errors for estimating motion.

In one embodiment after block 350 is completed post-processing of images is performed using the plurality of motion vectors, such as compression techniques, deinterlacing techniques, etc.

In one embodiment a machine-accessible medium contains instructions that, when executed, cause a machine, such as a desktop computer, a notebook, a server, a personal digital assistant (PDA), a digital camera/video recorder, a computerized gaming unit, etc., to perform the above method and computations.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a two-dimensional convolution unit to perform spatial image filtering on an inverted reference frame pixel set; and
   a mean square error (MSE) decision unit coupled to the two-dimensional convolution unit to perform motion estimation by selecting the displacement that minimizes MSE.

2. The apparatus of claim 1, further comprising:
   one of a video encoding unit, a compression unit, and an image enhancement unit coupled to the output of the MSE decision unit.

3. The apparatus of claim 2, wherein the video encoding unit processes motion vector output from the MSE decision unit to perform motion compensated deinterlacing or noise reductions.

4. The apparatus of claim 1, wherein the inverted reference frame pixel set is a plurality of one of rearranged and inverted target pixel set intensity values of a plurality of target pixel sets that are used as filter coefficients to estimate motion.

5. A system comprising:
   a processing unit;
   a memory coupled to the processing unit;
   a video processing unit coupled to the memory, the video processing unit having a two-dimensional convolution unit to filter an image including an inverse target pixel set.

6. The system of claim 5, the video processing unit further comprising:
   a reference frame mirroring unit coupled to the two-dimensional convolution unit; and
   a MSE decision unit coupled to the two-dimensional convolution unit.

7. The system of claim 6, further comprising:
   an image post-processing unit coupled to the minimum MSE selection unit.

8. The system of claim 6, wherein the reference frame mirroring unit inverses the sign of the target pixel set.

9. The system of claim 5, further comprising:
   one of a video display and an image recording device.

10. The system of claim 5, further comprising:
    a plurality of registers coupled to the image sequence processing unit.

11. A method comprising:
    inverting an address sign of each of the plurality of target frame pixel sets to mirror an image;
    inputting an inverted target frame pixel set as filter coefficients to a two-dimensional convolution unit;
    performing two-dimensional convolution with the filter coefficients;
    determining a plurality of mean square errors; and
    determining a pixel set that minimizes mean square errors for estimating motion.

12. The method of claim 11, further comprising:
    estimating/computing a plurality of motion vectors.

13. The method of claim 12, further comprising:
    post-processing images using the plurality of motion vectors.

14. The method of claim 12, the post-processing further including one of encoding and compressing images using the plurality of motion vectors.

15. The method of claim 12, wherein performing two-dimensional convolution and estimating motion are performed by one of a same hardware and software processing unit.

16. A non-transitory computer-readable medium encoded with a computer program containing instructions that, when executed, cause a machine to:
    receive an inverse target frame pixel set are at a convolution unit; perform two-dimensional convolution in the convolution unit; and
    determine a pixel set that minimizes a plurality of mean square errors to estimate motion in the processor.

17. The non-transitory computer-readable medium of claim 16, further comprising instructions to:
    output a plurality of estimated motion vectors; and
    post-process video using the plurality of estimated motion vectors.

18. The non-transitory computer-readable medium of claim 17, the post-process further including instructions to:
    one of encode, compress, and enhance a perceptual quality of an image sequence using the plurality of estimated motion vectors.

* * * * *